W. B. DAVIS.
Clover Huller.
No. 794.
Patented June 20, 1838.
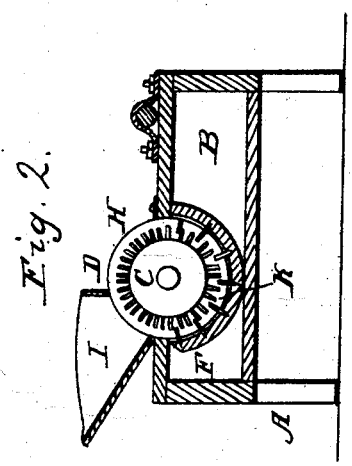
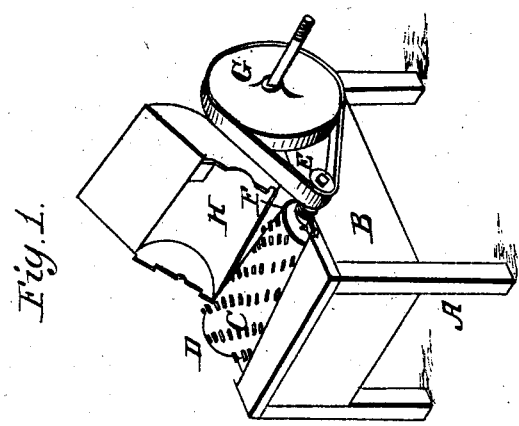

UNITED STATES PATENT OFFICE.

WM. B. DAVIS, OF READING TOWNSHIP, PERRY COUNTY, OHIO.

IMPROVEMENT IN MACHINES FOR THRASHING CLOVER-SEED.

Specification forming part of Letters Patent No. 794, dated June 20, 1838.

*To all whom it may concern:*

Be it known that I, WILLIAM B. DAVIS, of Reading township, in the county of Perry and State of Ohio, have invented a new and useful Machine to Thrash out Clover-Seed; and I do hereby declare that the following is a full and exact description of the construction and operation of said machine as invented by me, reference being had to the annexed drawings of the same, making part of this specification.

This machine consists of a frame, frustum of a cone, concave, wheel, and pulley.

The frame A consists of four posts two feet high, two and one-half inches by three inches square, framed onto side boards, B, ten inches wide, two and one-half inches thick, and when so framed to be three feet in length, and also framed into end boards ten inches wide, two and one-half inches thick, and when so framed to be two feet six inches wide. There is a frustum of a cone, C, about two feet in length, nine inches in diameter at one end, and seventeen inches in diameter at the other end, diminished in a straight line on the surface from one end to the other, to be made either of solid timber or staves about three inches thick, placed on the peripheries of wheels. said frustum of a cone is furnished with eight rows of iron teeth or spikes, D, projecting one inch and one-half from the surface of said frustum. Four of said rows have twelve and four rows have thirteen teeth in each of them, each row to commence at the small end of said frustum, set equidistant from each other crosswise said frustum, and set in a spiral or screw form lengthwise, and to turn half round the frustum in its length to the left. Said teeth or spikes in said frustum of a cone or runner are to be four and one-half inches long, one inch and a half of said length to be five-eighths of an inch thick, of round form and equal thickness, three inches of said length to be made into a square taper or diminished form, with beards cut in them, so as to secure them well into the runner. Said runner has an iron square bar or shaft one inch and a quarter thick put through its center to extend two and one-half inches beyond the runner at each end, so as to form proper journals, on which it revolves. The said iron bar or shaft extends five inches beyond the frame in a square form to receive a pulley, E, four and one-half inches in diameter and five inches thick, put on said bar next to the small end of the runner. A concave, F, the length of the runner is constructed under it, so as to conform to its shape and in width to half its circumference, made of five or more staves, commencing about the center of the runner, extending under and to finish at the top of the side boards on each side. Said concave should be of wood, covered or lined with sheet-iron. It is furnished with ten or eleven rows of spikes or teeth of the same kind of those in the runner, well fastened in said concave lengthwise, and so set that the teeth in the runner will pass between them, so as to leave about the sixteenth of an inch space between them on each side. Said concave is fixed permanently to the side boards of said frame to such a distance that the ends of the runner-teeth will just pass the concave about the sixteenth of an inch. A wooden band-wheel, G, is fixed on an iron shaft in the said frame about four or five inches from the pulley before described. The band for said wheel should be of heavy harness-leather five inches wide. Then said machine is to be attached to any power that will cause the runner to perform sixteen hundred revolutions in one minute. The runner is covered with a piece of sheet-iron, H, a segment of the same circle as the concave, having boards fastened at each end thereof and extended in front of said sheet-iron to be sufficiently long after forming the semicircle for the runner to be formed into a hopper, I, having a hole in said hopper to be about five inches square and placed immediately on top of the concave at the left-hand corner of it. Said hopper may be constructed of wood. A hole, K, is cut in the side board of said frame directly opposite the large end of said runner, just level with the concave, one and one-half inch in depth and about five inches in length, through which the seed passes off.

The machine being set in motion, the clover-hulls are put into the hopper and passed through the aperture in the same to the frustum of a cone and concave, where they are met by the teeth in the same, the spiral arrangement of the teeth forcing the clover heads and seed toward the base of the frustum of a cone, while the conical shape of the runner has a tendency to force the heads and seed in a contrary direction, thus retaining the substances to be acted upon by the teeth a longer time in the machine, till at length they are discharged at the aperture opposite the base or larger end of the runner, the seed being thus completely separated from the chaff.

What I claim as my invention, and which I desire to secure by Letters Patent, consists in—

So arranging the teeth on the frustum of a cone or runner as to cause the chaff and seed to be discharged at the base of the frustum of a cone, by which the heads of clover are retained a longer time in the machine subject to the action of the teeth, all constructed and arranged substantially as herein described.

WILLIAM B. DAVIS.

Witnesses:
  ISAAC DAVIS,
  JOHN ORWIGS.